United States Patent

[11] 3,549,839

| [72] | Inventors | George B. Hill;<br>Jacob D. Noorda, Salt Lake City, Utah |
|---|---|---|
| [21] | Appl. No. | 802,470 |
| [22] | Filed | Feb. 26, 1969 |
| [45] | Patented | Dec. 22, 1970 |
| [73] | Assignee | Brimco Manufacturing Company<br>Salt Lake City, Utah<br>a corporation of Utah |

[54] FLUID FLOW MONITOR
10 Claims, 3 Drawing Figs.

| [52] | U.S. Cl. | 200/81.9 |
|---|---|---|
| [51] | Int. Cl. | H01h 35/40 |
| [50] | Field of Search | 200/81.9M,<br>83.6, 61.45M |

[56] References Cited
UNITED STATES PATENTS

| 2,628,297 | 2/1953 | Grauer | 200/81.9(M) |
| 2,791,657 | 5/1957 | Bloxsom et al. | 200/81.9(M) |
| 2,963,563 | 12/1960 | Patterson | 200/81.9(M) |
| 3,057,977 | 10/1962 | Caswell | 200/81.9(M) |
| 3,200,214 | 8/1965 | Aubert | 200/81.9(M) |

OTHER REFERENCES

IBM Technical Disclosure Bulletin, Multiconfiguration Pressure Switch, Bolan et al, Vol. 8, No. 7, December 1965. Copy available in 200-83.6

*Primary Examiner*—Robert K. Schaefer
*Assistant Examiner*—J. R. Scott
*Attorneys*—C. Harvey Gold and David V. Trask ABSTRACT: A fluid flow monitoring device including a magnetic switch mounted adjacent a fluid-carrying conduit. A magnetic slug is contained by the conduit and is urged to the proximity of the switch by fluid flow through the conduit, thereby activating the switch.

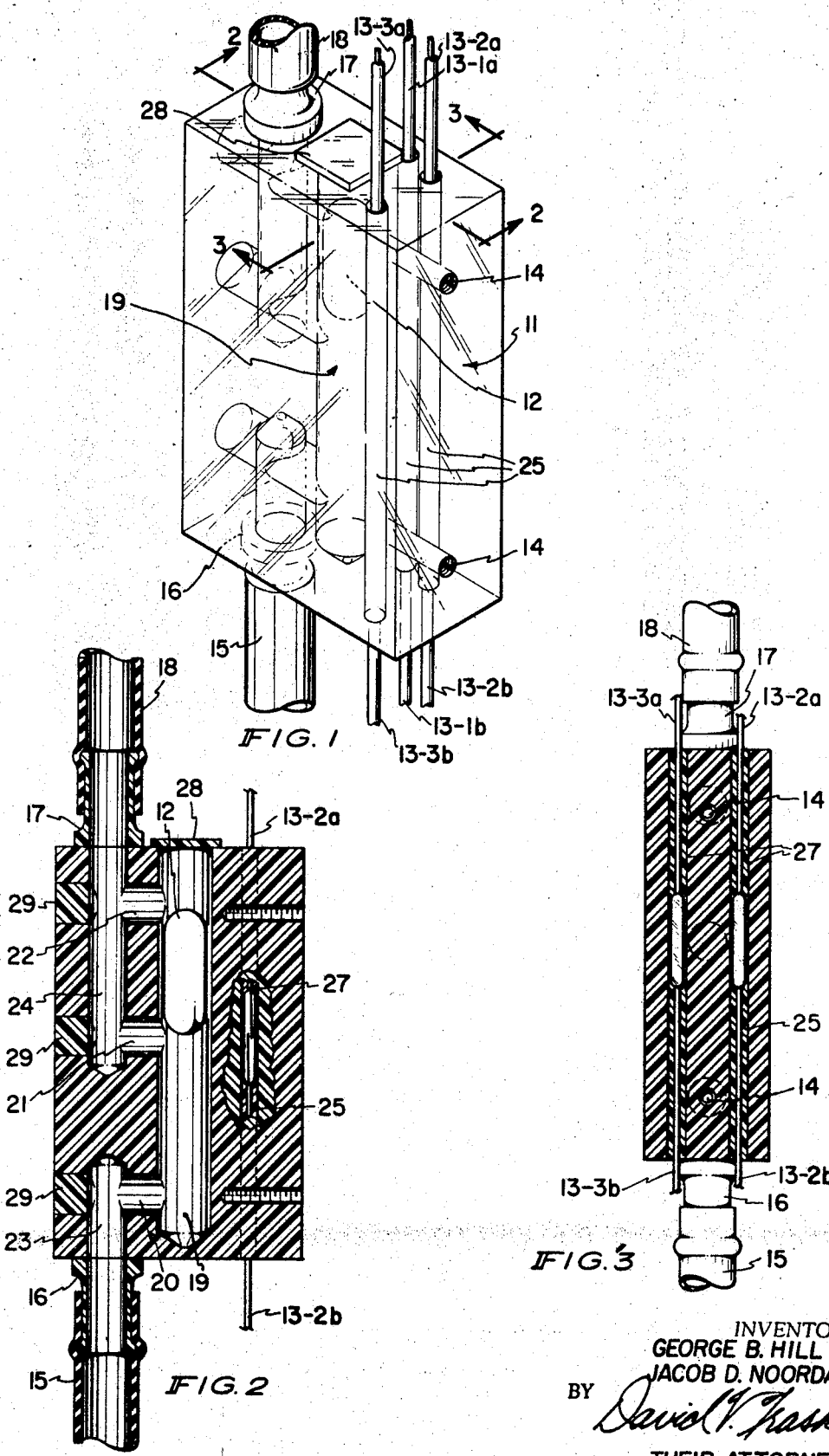

FLUID FLOW MONITOR

BACKGROUND OF THE INVENTION

1. Field

This invention relates to devices for monitoring fluid flow and provides a magnetic switch arrangement particularly suitable for monitoring the flow of corrosive fluids.

2. State of the Art

It is often desired to monitor the velocity of flow in a fluid system. Typical functions of the monitoring system are to automatically shut off equipment in response to dangerously high- or low-flow rates, activate warning signals when fluid flow in a system is in need of adjustment, or to function as one element of a control circuit which maintains proper flow conditions in the system. These functions require energizing an external electrical circuit. Available flow meters may be modified to energize external circuits, but such modifications are often unduly complicated or expensive for the particular application involved. Moreover, most fluids have corrosive properties to at least some extent and tend to attack the moving parts of flow meters or other monitoring devices which have mechanical links in contact with the fluid being monitored.

There remains a need for a simple, inexpensive, monitoring device to activate or deactivate an external circuit in response to the flow rate of a fluid, particularly a corrosive fluid, without direct contact of mechanically linked moving parts with the fluid.

SUMMARY OF THE INVENTION

The present invention provides a simple, easily constructed monitor for fluid systems. The monitor of this invention includes a straight, fluid carrying, monitoring conduit with an inlet at one end and an outlet adapted for connection into a fluid line so that fluid flows into the conduit at one end and exits the conduit from a point longitudinally remote from the inlet. A magnetic slug, which may be of any magnetic material, either magnetized or unmagnetized, is loosely contained by the conduit so that it may be moved longitudinally toward or away from the inlet. The normal position of the slug in the conduit, in the absence of fluid flow, is in the vicinity of the inlet. When fluid is forced through the conduit, the slug is urged longitudinally away from the inlet, toward or past the outlets.

The slug is mounted in the conduit to resist movement from the inlet so that its longitudinal position in the conduit is dependent upon the velocity of the fluid flow through the conduit. Usually, the monitoring conduit is mounted approximately vertically in use, with the inlet at its lower end. The weight of the magnetic slug then provides resistance to longitudinal movement by flowing fluid. When gravity provides insufficient resistance for a particular application, additional biasing of the slug toward the inlet may be provided. Usually, it is preferred, however, to rely upon other expedients to adjust the extent of longitudinal displacement of the slug by a given velocity of flow. For example, increasing the length or diameter of the monitoring conduit is usually preferable to placing a spring inside the conduit.

A magnetic switch, i.e., a switch which opens or closes in response to magnetic attraction, is mounted in the proximity of the conduit at a region such that it is activated by magnetic interaction with the slug when the slug is urged to a predetermined longitudinal location within the conduit. The switch may include a magnetized element and the slug may be of magnetic (e.g. ferrous) material. Generally, however, the slug is magnetized and the switch includes a contact mounted to move toward a second contact under the influence of the magnetic field of the slug. The magnetic switch is adapted for connection to an external electrical circuit which may preform any desired signaling, or control function.

The magnetic switch is completely isolated from the fluid being monitored and is thus not subject to corrosion or wear by the fluid. The magnetic slug may be coated by a material refractory to the fluid being monitored and the conduit may be similarly constructed or refractory or corrosion-resistant material. The only moving parts of the monitor are the slug and the make and break connection of the switch. Because no mechanical linkages are in contact with either moving or corrosive fluid, the total system has little if any tendency to wear.

It is within contemplation to mount a plurality of magnetic switches to be sequentially activated in turn as the slug is urged to greater longitudinal distances from the conduit inlet. Thus, several external electrical circuits may be energized in response to different selected flow rates of a fluid through a conduit. It is also within contemplation that the magnetic switch be mounted in association with means for adjusting its longitudinal position with respect to the inlet of the conduit. In this fashion, the flow rate required for a particular fluid being monitored to close the switch may be adjusted. The monitors of this invention may be connected directly into the system being monitored such that all of the fluid in the system passes through the monitoring conduit or a small bleed stream may be diverted through the monitoring conduit. By using bleed streams, it is possible to use smaller monitoring systems, which is generally advantageous from the standpoint of the cost.

DESCRIPTION OF THE DRAWINGS

In the drawings, which illustrate what is presently regarded as the best mode for carrying out the invention:

FIG. 1 is a perspective view of a preferred form of this invention;

FIG. 2, a plan view, in section, taken along the line 2–2 of FIG. 1, partially broken to expose a reed switch; and FIG. 3, a plan view, in section, taken along the line 3–3 of FIG. 1.

DESCRIPTION OF THE ILLUSTRATED EMBODIMENT

The illustrated embodiment is conveniently manufactured by drilling appropriate bore holes in a support block 11 of any suitable material refractory to the fluid to be monitored. Commercially available magnetic slugs 12 and reed switches 13 are then installed in the appropriate bore holes as illustrated. For many applications, an acrylic plastic block about 1 inch ×2 inches ×3 inches constitutes a suitable support block, although much larger monitoring units are within contemplation.

The illustrated monitor may be attached to any convenient chassis or mounting bracket by means of the tapped holes 14 provided for that purpose. A fluid-delivery hose (or pipe) 15, which may be a system line or a bleed line, is connected to an inlet nipple 16 at the lower end of the support block 11. An outlet nipple 17 at the upper end of the support block 11 is connected to a hose (or pipe) 18 to return fluid to the system being monitored. Lead pairs 13—1a, 2a and 3a, and 13—1b, 2b, and 3b of the read switches 13 are connected to appropriate external circuits as required.

A vertical monitoring conduit 19 is bored into the support block 11. A lateral inlet 20 and two lateral outlets 21 and 22 are bored from one side of the support block to openly communicate with the vertical bore 19. The uppermost lateral outlet 22, although not always essential, is generally preferred and almost always helpful, to avoid hydrostatic back pressures above the magnetic slug 12 as it is lifted by fluid to above the lower lateral outlet 21. It is desirable to locate the lower outlet 21 such that under normal operating conditions the slug 12 is held above the outlet, thereby reducing resistance to flow through the system being monitored. The lateral inlet 20 is tapped by a vertical bore 23 and the two lateral outlets 21 and 22 are tapped by a single vertical bore 24 to communicate with the inlet nipple 16 and outlet nipple 17, respectively. A series of bore holes 25 is drilled completely through the support block parallel the monitoring conduit 19 to accommodate the magnetic switches 13. After a switch is installed in its desired location, the entire bore 25 may be filled with epoxy or other resinous material 27, as illustrated. The magnetic slug 12 is placed in the monitoring conduit 19 and the top of the bore hole 19 is capped 28 as shown. The lateral bores 20, 21 and 22 are also plugged, e.g., with epoxy, 29 as shown.

Although it is within contemplation that means be provided for adjusting the elevations of the magnetic switches 13 in the bore holes 25 after the claimed fluid flow monitoring device is installed, it is generally preferred to assemble the monitor, connect the inlet nipple 16 and outlet nipple 17 to fluid lines, adjust the flow of fluid through the monitoring conduit 19, position each magnetic switch 13 at its appropriate elevation to obtain the desired switch action, and then fill the bore 25, as illustrated. In this fashion, a precalibrated monitor, set to energize an external circuit at a prescribed flow rate of a particular fluid of specific density, can be provided to order.

Although gaseous fluids can be monitored with the claimed device, it is presently most useful for monitoring the flow of corrosive liquids.

Reference herein to details of the preferred embodiments is not intended to limit the claims which themselves recite those elements regarded as essential to the invention.

We claim:

1. A fluid flow monitor, comprising:
   a straight, monitoring conduit with an inlet at one end and an outlet;
   a magnetic slug loosely contained by said monitoring conduit such that when the monitor is oriented with said inlet below said outlet and fluid flows from said inlet to said outlet through said monitoring conduit, resistance to longitudinal movement of the slug through the conduit by said fluid is provided solely by the weight of said slug, whereby in the absence of fluid flow through said conduit said slug rests near the inlet under the influence of gravity but when fluid flows through said conduit the slug is carried by the fluid for a distance depending upon the velocity of the fluid longitudinally in said conduit away from said inlet; and
   switch means, operably responsive to magnetic attraction, adapted for connection into an external electric circuit, mounted in the proximity of the conduit at a region such that it is operated by magnetic interaction with the slug when the slug is urged a predetermined distance from the inlet.

2. The monitor of claim 1 wherein the conduit is located in its normal position of use approximately vertical with its inlet at its lower end so that the slug is urged upward by fluid flow through the conduit to an elevation dependent upon the velocity of the flow.

3. The monitor of claim 2 wherein the slug is magnetized and the switch includes contact points which close in response to the slug when it is urged to a predetermined longitudinal position in the conduit.

4. The monitor of claim 2 including a first outlet openly communicating with a region of the conduit intermediate its vertical height and a second outlet openly communicating with the conduit at a region further removed from the inlet.

5. The monitor of claim 2 wherein the monitoring conduit comprises a first vertical bore in a support block, and the switch means is mounted in a second vertical bore in said block parallel said monitoring conduit.

6. The monitor of claim 5 wherein the outlet means is a lateral bore in said support block openly communicating with said monitoring conduit at an intermediate longitudinal position such that the slug may be urged by fluid flow to an elevation above said outlet.

7. The monitor of claim 6 including a second outlet comprising a second lateral bore openly communicating with said monitoring conduit, at a higher elevation than said first outlet to relieve pressure above said slug when it is urged above said first outlet, said first and second outlets being connected external the monitoring conduit.

8. The monitor of claim 7 wherein the inlet includes a lateral chamber openly communicating with the lower end of the monitoring conduit and the first and second lateral outlets are connected by a vertical bore in the support block, said vertical connecting bore and said inlet being openly connected to means at respective opposite ends of the support block for connection of the outlet and inlet, respectively, to a fluid system.

9. The monitor of claim 5 including means for adjusting longitudinal position of said switch relative the inlet of the monitoring conduit.

10. The monitor of claim 2 wherein the slug is coated with a material refractory to the fluid being monitored.